US010368133B1

United States Patent
Denk, Jr. et al.

(10) Patent No.: US 10,368,133 B1
(45) Date of Patent: Jul. 30, 2019

(54) MEDIA RECOMMENDATION SYSTEM AND METHOD

(71) Applicant: FlikFlix, LLC, Dana Point, CA (US)

(72) Inventors: William Edward Denk, Jr., Laguna Niguel, CA (US); Nima Jalali, Irvine, CA (US); James Heller, San Juan Capistrano, CA (US); Adam William Denk, Laguna Niguel, CA (US)

( * ) Notice: Subject to any disclaimer, the term of this patent is extended or adjusted under 35 U.S.C. 154(b) by 0 days.

(21) Appl. No.: 15/480,228

(22) Filed: Apr. 5, 2017

Related U.S. Application Data

(60) Provisional application No. 62/318,583, filed on Apr. 5, 2016.

(51) Int. Cl.
| | |
|---|---|
| H04N 21/258 | (2011.01) |
| H04N 21/475 | (2011.01) |
| H04N 21/25 | (2011.01) |
| H04N 21/466 | (2011.01) |
| H04N 21/45 | (2011.01) |
| H04N 21/482 | (2011.01) |
| H04N 21/431 | (2011.01) |
| G06F 3/0482 | (2013.01) |
| G06F 3/0488 | (2013.01) |

(52) U.S. Cl.
CPC ....... *H04N 21/4756* (2013.01); *G06F 3/0482* (2013.01); *G06F 3/0488* (2013.01); *H04N 21/251* (2013.01); *H04N 21/25891* (2013.01); *H04N 21/431* (2013.01); *H04N 21/4532* (2013.01); *H04N 21/4668* (2013.01); *H04N 21/4826* (2013.01)

(58) Field of Classification Search
None
See application file for complete search history.

(56) References Cited

U.S. PATENT DOCUMENTS

| | | | | |
|---|---|---|---|---|
| 6,002,394 | A * | 12/1999 | Schein | H04N 5/44543 348/E5.104 |
| 2011/0093329 | A1* | 4/2011 | Bodor | G06Q 30/02 705/14.42 |
| 2012/0110621 | A1* | 5/2012 | Gossweiler, III | G06Q 50/01 725/46 |
| 2016/0142783 | A1* | 5/2016 | Bagga | H04N 21/47214 725/47 |

* cited by examiner

*Primary Examiner* — Mulugeta Mengesha
*Assistant Examiner* — Charles N Hicks
(74) *Attorney, Agent, or Firm* — Polsinelli PC

(57) ABSTRACT

A system includes a memory and at least one processor to transmit information associated with a plurality of talents to a client computing device, receive a selection of at least one talent of the plurality of talents from the client computing device associated with a user profile, determine a list of shows featuring the at least one talent, each show in the list of shows having a rating greater than or equal to a particular threshold, transmit the list of shows featuring the at least one talent to the client computing device, receive feedback for each show of the list of shows from the client computing device, and transmit a list of recommended shows available from subscribed media providers to the client computing device based on the feedback.

22 Claims, 14 Drawing Sheets

MEDIA RECOMMENDATION SYSTEM AND METHOD

CROSS-REFERENCE TO RELATED APPLICATION

This application is related to and claims priority under 35 U.S.C. § 119(e) to U.S. Patent Application No. 62/318,583, filed Apr. 5, 2016, entitled "A recommendation system that minimizes the time Viewers spend to find the Shows they'll enjoy (by themselves as well as with others)," the entire contents of which are incorporated herein by reference.

BACKGROUND

Americans have gradually shifted away from viewing television shows and movies that are broadcast on traditional channels available from cable television providers and satellite television providers. At the same time, the purchase and use of physical media such as DVDs and Blu-ray discs has declined. Many Americans no longer subscribe to a traditional cable or satellite television subscription. According to Nielsen, about two in five American households now subscribe to a video on demand provider such as iTunes®, Netflix®, Amazon®, or Hulu®. Viewers may watch these shows and movies on their televisions that are connected to the internet and other devices such as smartphones and tablets using software applications that provide these video on demand services to their televisions or devices.

As an example, Hulu has over one hundred thousand television shows and seventeen thousand movies and iTunes has over forty five thousand movies and eighty five thousand television shows. Each video on demand service has a different set of television shows and movies. Although a viewer has easy access to these large libraries of shows and movies, it is difficult to find a particular show or movie, especially one that may be worth watching. This can lead to a frustrating experience where a viewer may spend a considerable amount of time trying to find a show or movie that is worth watching. In some cases, searching for a show can take just as long as watching the show.

It is with these issues in mind, among others, that various aspects of the disclosure were conceived.

SUMMARY

According to one aspect, a media recommendation system is provided that allows a user to select one or more talents, e.g., actors, which the user likes. The user may use an application executed by a computing device having a touchscreen. After selecting the one or more actors, the user may be presented with a plurality of shows that are highly rated that feature the one or more actors. The user may be asked to provide feedback for each of the plurality of shows by providing gestures to the touchscreen. The user may be asked to provide information associated with their video on demand services. The user may provide login information for each of their video on demand services that they may subscribe to. Based on the feedback and the selected video on demand services, a list of recommended shows is determined.

According to a first aspect, a system includes a memory and at least one processor to transmit information associated with a plurality of talents to a client computing device, receive a selection of at least one talent of the plurality of talents from the client computing device associated with a user profile, determine a list of shows featuring the at least one talent, each show in the list of shows having a rating greater than or equal to a particular threshold, transmit the list of shows featuring the at least one talent to the client computing device, receive feedback for each show of the list of shows from the client computing device, and transmit a list of recommended shows available from subscribed media providers to the client computing device based on the feedback.

According to another aspect, a system includes a memory and at least one processor to display a plurality of talent user interface elements on a user interface displayed on a touchscreen display, each talent user interface element associated with a talent, receive a selection of at least one talent user interface element of the plurality of user interface elements, transmit the selection of the at least one talent to a server computing device, receive, from the server computing device, a list of shows featuring the at least one talent, each show in the list of shows having a rating greater than or equal to a particular threshold, display a plurality of show user interface elements on the user interface displayed on the touchscreen display, each show user interface element associated with a show in the list of shows, receive feedback for each show in the list of shows based on a gesture provided on the touchscreen to each show user interface element, transmit the feedback for each show in the list of shows to the server computing device, and receive, from the server computing device, a list of recommended shows available from subscribed media providers based on the feedback.

According to another aspect, a method includes displaying, by a processor, a plurality of talent user interface elements on a user interface displayed on a touchscreen display, each talent user interface element associated with a talent, receiving, by the processor, a selection of at least one talent user interface element of the plurality of user interface elements, transmitting, by the processor, the selection of the at least one talent to a server computing device, receiving, by the processor, from the server computing device, a list of shows featuring the at least one talent, each show in the list of shows having a rating greater than or equal to a particular threshold, displaying, by the processor, a plurality of show user interface elements on the user interface displayed on the touchscreen display, each show user interface element associated with a show in the list of shows, receiving, by the processor, feedback for each show in the list of shows based on a gesture provided on the touchscreen to each show user interface element, transmitting, by the processor, the feedback for each show in the list of shows to the server computing device, and receiving, by the processor, from the server computing device, a list of recommended shows available from subscribed media providers based on the feedback.

According to an additional aspect, a non-transitory computer-readable storage medium includes instructions stored thereon that, when executed by a computing device cause the computing device to perform operations, the operations including displaying a plurality of talent user interface elements on a user interface displayed on a touchscreen display, each talent user interface element associated with a talent, receiving a selection of at least one talent user interface element of the plurality of user interface elements, transmitting the selection of the at least one talent to a server computing device, receiving, from the server computing device, a list of shows featuring the at least one talent, each show in the list of shows having a rating greater than or equal to a particular threshold, displaying a plurality of show user interface elements on the user interface displayed on the touchscreen display, each show user interface element associated with a show in the list of shows, receiving feedback for each show in the list of shows based on a gesture provided on the touchscreen to each show user interface element, transmitting the feedback for each show in the list of shows to the server computing device, and receiving, from the server computing device, a list of recommended shows available from subscribed media providers based on the feedback.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
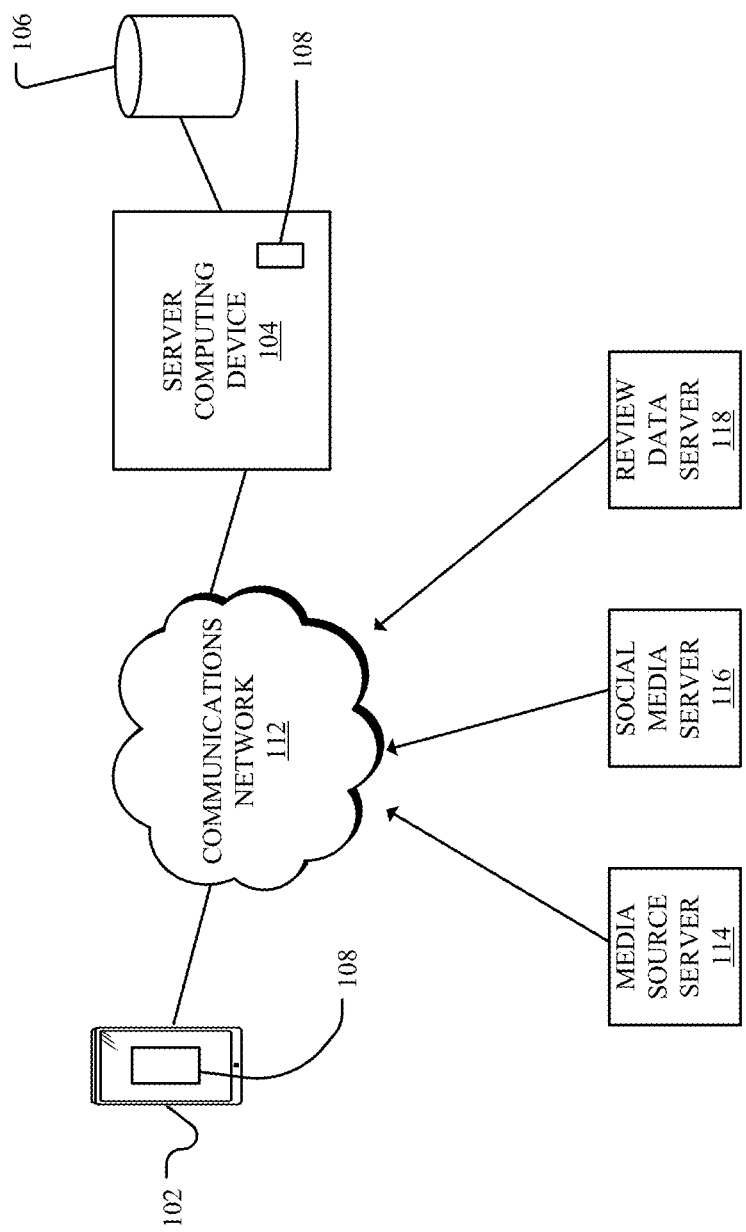
FIG. 1 is a block diagram of a media recommendation system according to an example embodiment.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

The client computing device and the server computing device communicate over a communications network using Hypertext Transfer Protocol (HTTP) and/or other communications protocols. HTTP provides a request-response protocol in the client-server computing model. A client application running on the client computing device may be a client and a server application running on the server computing device may be the server, e.g., a web server. The client submits, for example, an HTTP request to the server. The web server of the server computing device provides resources, such as Hypertext Markup Language (HTML) files and/or other content, and performs other functions on behalf of the client, and returns an HTTP response message to the client. Other types of communications using different protocols may be used in other examples.

The one or more computing devices may communicate based on representational state transfer (REST) and/or Simple Object Access Protocol (SOAP). As an example, a first computer (e.g., a client computer) may send a request message that is a REST and/or a SOAP request formatted using Javascript Object Notation (JSON) and/or Extensible Markup Language (XML). In response to the request message, a second computer (e.g., a server computer) may transmit a REST and/or SOAP response formatted using JSON and/or XML.

Aspects of a system and method for media recommendation provide a client application that allows a first user to create a user profile, select one or more talents (e.g., actors) from a plurality of talents, provide feedback about one or more shows involving the one or more talents, select one or more video on demand providers (e.g., Netflix, iTunes), and receive a list of recommended shows based on the feedback. A show may be a television show, a movie, a live performance, or another type of media or entertainment. Alternatively, other than shows, the system may recommend another good or service (e.g., a restaurant) based on selections and feedback provided by the user.

The server receives the one or more talents, receives the feedback about the one or more shows, and determines the list of recommended shows. When determining the list of recommended shows, the server may utilize rating and review information from other sources and servers such as IMDb and Rotten Tomatoes, among others. In addition, the list of recommended shows may be based on the selected one or more video on demand providers. Each video on demand provider may have a different catalog of content such as television shows and movies. The user profile may be associated with a first video on demand provider but not a second video on demand provider. The list of recommended shows for the user profile may only include shows from the first video on demand provider but not the second video on demand provider. Alternatively, the list of recommended shows may include shows from the first video on demand provider and note that other shows are available from the second video on demand provider but indicate that the user does not subscribe to the second video on demand provider.

In addition, the user profile may be associated with a first client computing device. The first user may want to watch a television show or movie with a second user. The second user may also create a user profile, select one or more talents, and provide feedback about one or more shows involving the one or more talents. The server may determine a list of recommended shows for the first user and the second user. This list of recommended shows may include shows that the first user and the second user may both enjoy.

Conventional video on demand services have rudimentary ways to help users find shows such as recommended movies (Amazon), top picks for you (Hulu), viewers also watched/bought (iTunes), suggested lists (Netflix), and other conventional popular and trending show information. Thus, each of these services tracks what the user watches but the services do not keep track of which shows that the user likes or does not like. When a user purchases a show or movie or rents a show or movie, this may indicate that the user likes the show. Currently, a user can provide a rating or review of a movie or television show using iTunes, but the user must visit a landing page for the purchased show or television show in iTunes and deliberately provide the rating or review. The user cannot easily provide information about whether the user likes, dislikes, or loves a show. In addition, traditional purchases of media and renting media are diminishing and giving way to streaming and media service plans that include unlimited shows and movies. Thus, these traditional video on demand solutions are not suitable for providing adequate media recommendations.

Currently, when a viewer wants to select a show to watch, the user may have to select a genre, pan or scroll through shows based on cover art and titles, and choose a show to reveal its rating and other information such as actors, and a button to activate a preview. The user may then play the preview. The user may have to repeat this process a number of times to find a show that may be suitable. However, the user may have no idea whether the show is something that the user may like. The current options are clunky and frustrating and do not provide viewers with an easy way to find and watch media best suited for a particular viewer.

FIG. 1 shows a block diagram of a computing system that includes a media recommendation system 100 according to an example embodiment. The media recommendation system 100 includes at least one client computing device 102 that is in communication with at least one server computing device 104 via a communications network 112. In addition, the media recommendation system 100 includes one or more media source servers 114, one or more social media servers 116, and one or more review data servers 118 that are in communication with the server computing device 104 via the communications network 112. The media source servers 114 may be provided by media providers such as video on demand (VOD) providers including iTunes®, Netflix®, Hulu®, Amazon®, and others. Each media provider may provide a catalog of media content such as television shows and movies, among other media. The social media servers 116 may be provided by social media providers such as Facebook®, Twitter®, Instagram®, Snapchat®, and others. Each social media provider may have a plurality of users that share information such as information about media content such as television shows and movies. The review data servers 118 may be provided by review/rating providers such as the Internet Movie Database (IMDb), Rotten Tomatoes, Metacritic, and others. Each review/rating provider may have a plurality of reviews/ratings about media content such as television shows, movies, and other types of media.

The at least one client computing device 102 may have a client component of a media recommendation application 108 and the at least one server computing device 104 may have a server component of the media recommendation application 108 that communicates with at least one database 106 that comprises a non-relational database and/or a relational database for storing user information, talent information, feedback information, and media recommendation information, among other data. As an example, the information may be stored in a relational database management system (RDBMS), an open source distributed database management system such as a Not only SQL (NoSQL) database management system, an in-memory database (IMDB) management system, or another appropriate database management system. As an example, each user of the system may have associated information stored in the database 106.

As an example, favorite talents may be stored in a first table, feedback about media, e.g., shows, may be stored in a second table, media recommendation information may be stored in a third table, and user account information (e.g., username/password information or unique identification information) may be stored in a fourth table of the database 106. Other tables may store additional information. Each user may have a particular identifier that is used to reference the user in the database 106. In addition, each user may have a list of favorite talents, feedback about shows, a list of recommended shows, and user account information.

The at least one server computing device 104 is configured to receive data from and/or transmit data to the at least one client computing device 102 through the communications network 112. Although the at least one server computing device 104 is shown as a single server, it is contemplated that the at least one server computing device 104 may include multiple servers, for example, in a cloud computing configuration.

The one or more computing devices communicate and coordinate their actions by passing messages over the communications network 112. The communications network 112 can be one or more of the Internet, an intranet, a cellular communications network, a WiFi network, a packet network, or another wired and/or wireless communication network or a combination of any of the foregoing. As an example, the one or more computing devices communicate data in packets, messages, or other communications using a common protocol, e.g., Hypertext Transfer Protocol (HTTP) and/or Hypertext Transfer Protocol Secure (HTTPS). As an example, the media recommendation system 100 may be a cloud-based computer system or a distributed computer system.

The media recommendation application 108 may be a component of an application and/or service executable by the client computing device 102 and/or the server computing device 104. For example, the media recommendation application 108 may be a single unit of deployable executable code or a plurality of units of deployable executable code. According to one aspect, the media recommendation application 108 may be a web application, a native application, and/or a mobile application (e.g., an app) downloaded from a digital distribution application platform that allows users to browse and download applications developed with mobile software development kits (SDKs) including the App Store and GOOGLE PLAY®, among others. The media recommendation application 108 may be installed on the client computing device 102, which may have the iOS operating system or an ANDROID™ operating system, among other operating systems. In an exemplary embodiment, the media recommendation application 108 may include a first client component executed by the client computing device 102 and a second server component executed by the at least one server computing device 104.

Figure 2:
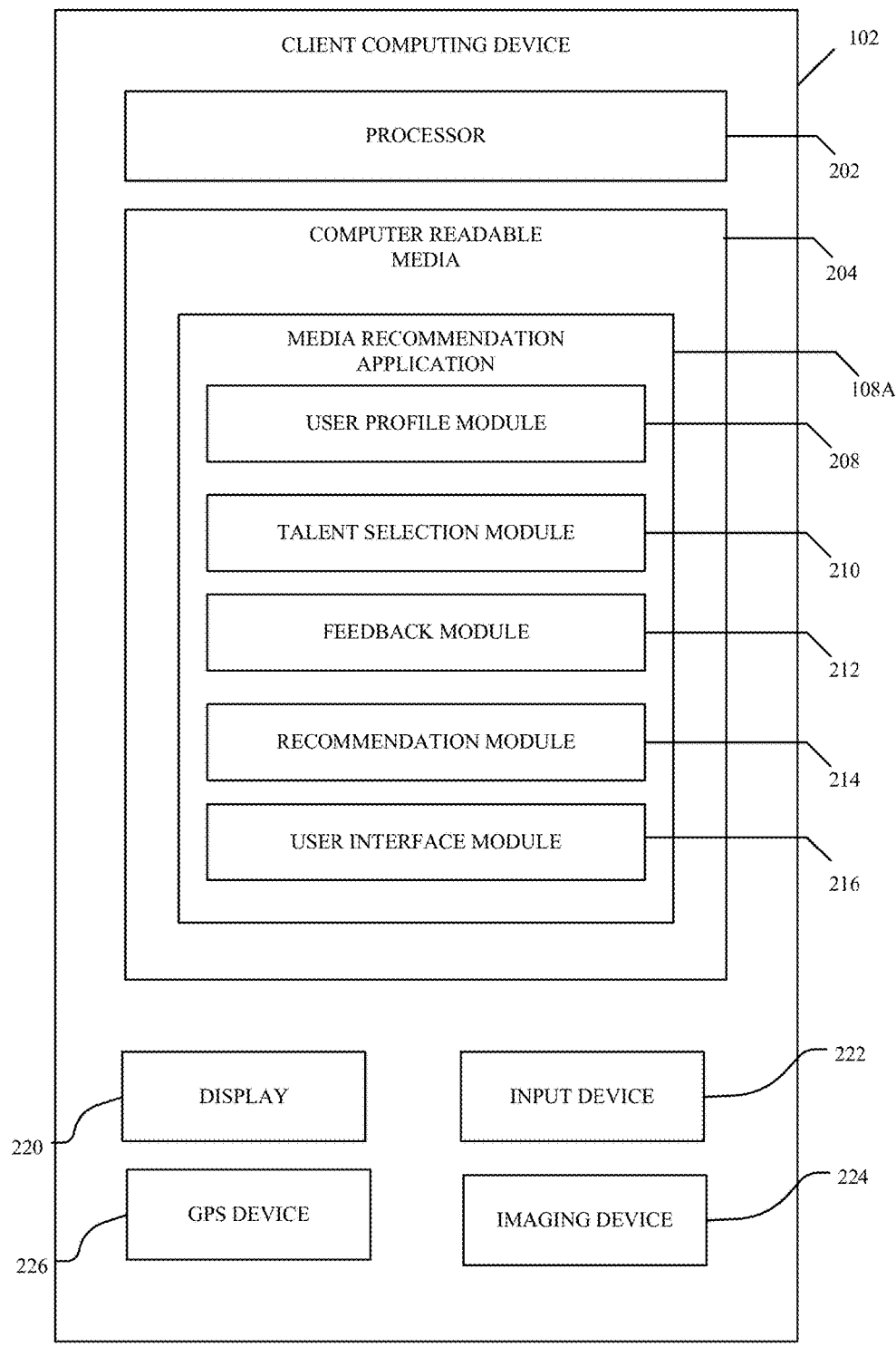
FIG. 2 illustrates a block diagram of a client computing device according to an example embodiment.

FIG. 2 illustrates a block diagram of the client computing device 102 according to an example embodiment. The client computing device 102 may be a computer having a processor 202 and memory, such as a laptop, desktop, tablet computer, mobile computing device (e.g., a smartphone), a wearable device, a remote, a game controller, or a dedicated electronic device having a processor and memory. The one or more processors 202 process machine/computer-readable executable instructions and data, and the memory stores machine/computer-readable executable instructions and data including one or more applications, including a client component of the media recommendation application 108A. The processor 202 and memory are hardware. The memory includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory may also include a dedicated file server having one or more dedicated processors, random access memory (RAM), a Redundant Array of Inexpensive/Independent Disks (RAID) hard drive configuration, and an Ethernet interface or other communication interface, among other components.

The client computing device 102 uses the media recommendation application 108A to transmit data and messages and receive messages, data, and/or resources from the one or more server computing devices 104. The media recommendation application 108A provides a user interface for a user to create a user profile, select one or more favorite talents, provide feedback about one or more shows involving the one or more favorite talents, provide information associated with subscribed media providers, and receive a list of recommended shows provided by the subscribed media providers based on the feedback.

In order to obtain access to protected resources associated with the server computing device 104, e.g., resources stored in the database 106, the client computing device 102 optionally may transmit a request or other communication, such as with a representation of a username and a password, to the server computing device 104 using lightweight directory access protocol (LDAP), HTTP, hypertext transport protocol secure (HTTPS) and/or other protocols. The request may be a LDAP request, a representational state transfer (REST) request, a Simple Object Access Protocol (SOAP) request, or another type of request. The server computing device 104 optionally verifies the username and password and transmits a response or other communication to the client computing device 102 or otherwise grants access to the client computing device to create and view data. The server computing device 104 may transmit an HTTP response, an HTTPS response, a LDAP response, a REST response, a SOAP response, and/or another type of response.

The username and password may be encrypted by the client computing device 102 using transport layer security (TLS), secure sockets layer (SSL), and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the server computing device 104 without directly sending the username and password to the server computing device via the communications network 112.

The media recommendation application 108A may be a component of an application and/or service executable by the client computing device 102. For example, the media recommendation application 108A may be a single unit of deployable executable code. The media recommendation application 108A may be one application and/or a suite of applications. According to an example embodiment, the media recommendation application 108A may be a native application or a mobile application (e.g., an app) downloaded from a digital distribution application platform that allows users to browse and download applications developed with mobile software development kits (SDKs) including the App Store and GOOGLE PLAY®, among others. The app may be installed on the client computing device 102, which may have the iOS operating system or an ANDROID™ operating system, among other operating systems. The media recommendation application 108A communicates messages to the server computing device 104 and receives messages from the server computing device, e.g., HTTP requests and corresponding HTTP responses. The responses may comprise requested content.

The client computing device 102 further includes a display 220 and an input device 222. The display 220 is used to display visual components of the media recommendation application 108A, such as at a user interface. In one example, the user interface may display a user interface of the media recommendation application 108A, and a representation of the requested resources received from the server computing device 104. The display 220 can include a cathode-ray tube display, a liquid-crystal display, a light-emitting diode display, a touch screen display, and/or other displays. The input device 222 is used to interact with the media recommendation application 108A or otherwise provide inputs to the client computing device 102 and may include a mouse, a keyboard, a trackpad, a microphone, and/or the like. The input device 222 may be included within the display 220 if the display is a touch screen display. The input device 222 allows a user of the client computing device 102 to manipulate the user interface of the media recommendation application 108A or otherwise provide inputs to be transmitted to the server computing device 104.

The client computing device 102 may include an imaging device 224, e.g., a camera for capturing video and/or still images and photographs, an optional sound device for providing audio output that may be associated with a notification provided by the server computing device 104 and received by the media recommendation application 108A or other user interface or application and an optional vibration motor for providing vibration feedback that may be associated with a notification provided by the server computing device 104 and received by the media recommendation application 108A. The client computing device 102 also may include a global positioning system (GPS) device 226 for obtaining a current location of the client computing device 102.

The client computing device 102 includes computer readable media (CRM) 204 in memory on which the media recommendation application 108A or other user interface or application is stored. The computer readable media may include volatile media, nonvolatile media, removable media, non-removable media, and/or another available medium that can be accessed by the processor 202. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The media recommendation application 108A includes a user profile module 208 for creating a user account for use with the media recommendation system 100. The user profile module 208 receives user account information including username information, e.g., GameofThronesLover, password information, e.g., 1234Secret, and contact information such as an email address, among other information such as biometric information for the user. The biometric information may include a representation of a fingerprint of the user. Alternatively, the user profile may be created using a unique identifier for the user that may be based on a device identifier that represents the client computing device 102. The user account module 208 receives input from a user of the media recommendation application 108A and transmits the user account information to the server computing device 104 to create the user account for use with the media recommendation system 100.

The media recommendation application 108A further includes a talent selection module 210 for displaying user interface elements associated with one or more talents. Each user interface element may be a button or balloon that shows an image associated with the talent. As an example, the image may be an image of a face of the talent or may be an icon associated with the talent. The talent may be an actor of a television show, movie, or live performance, a producer of a television show, movie, or live performance, a director of a television show, movie, or live performance, an author, a podcaster, a comedian, an artist, a musician, and a band, among others. In addition, although the application is described in the context of media, the application could be used to select and recommend food genres, chefs, restaurants, wines, beers, spirits, clothes, live streaming gamers, video games, video broadcasters, YouTubers, and board games, among others. A user may select the one or more talents by tapping one or more user interface elements that represent talents that the user enjoys. Alternatively, the user may select the one or more talents using their voice. The microphone of the client computing device may record audio and determine the one or more talents. The user may select Tom Hanks and Robert De Niro, among others. After the user selects the one or more talents, the talent selection module 210 may transmit the selected talents to the server computing device 104. Alternatively, the client computing device may transmit the audio to the server computing device 104 and the server computing device 104 may determine the one or more talents based on the audio.

The media recommendation application 108A further includes a feedback module 212 for displaying user interface elements associated with media based on the selected one or more talents. As an example, after the user selects the one or more talents, the server computing device 104 may determine one or more shows or another type of media. The one or more shows may have the one or more talents. As an example, Tom Hanks may star in a first show, a second show, and a third show and Robert De Niro may star in a fourth show, a fifth show, and a sixth show. Each of the one or more shows may have a rating or review that is greater than or equal to a particular threshold. As an example, each of the one or more shows may have one of an IMDb rating greater than or equal to 6.9 and a Rotten Tomatoes rating greater than or equal to 61%. Other thresholds are possible. The user is asked to provide feedback regarding each of the one or more shows.

The feedback module 212 may display the user interface elements that are buttons that have show cover art or movie poster art for each of the one or more shows. The user may provide feedback regarding each show by providing a gesture on the user interface element. As an example, the user may swipe or flick the user interface element to the right to indicate that the user likes the show. The user may swipe or flick the user interface element to the left to indicate that the user dislikes the show. The user may swipe or flick the user interface element down to indicate that the user has never seen the show, is not familiar with the show, does not recall whether they have seen the show, or has no opinion regarding the show. The user may swipe or flick the user interface element up to indicate that the user loves the show.

Alternatively, the user may provide feedback using their voice. The microphone of the client computing device 102 may record audio and determine the feedback. As an example, the user may say "Like," "Dislike," "Yes," "No," "Don't Know," and "Love," among other things and the client computing device 102 may determine the feedback based on the spoken audio. After receiving the feedback from the user, the feedback module 212 transmits the feedback to the server computing device 104. Alternatively, the client computing device 102 may transmit the audio to the server computing device 104 and the server computing device 104 may determine the feedback based on the audio.

The media recommendation module 108A further includes a recommendation module 214 for displaying user interface elements associated with recommended media based on the selected one or more talents and the feedback. In addition, the recommended media is provided based on one or more selected media providers and may be television shows or movies, among other things. As an example, the user is requested to select one or more media providers that the user subscribes to such as Hulu, Amazon, Netflix, iTunes, Google Play, Crackle, MUBI, Epix, Fandor, HBO Now, HBO Go, PlayStation, Realeyz, YouTube, and others. The user also may be requested to install an application that may be associated with the one or more media providers, provide login information for the one or more media providers, and provide payment information.

Figure 9:
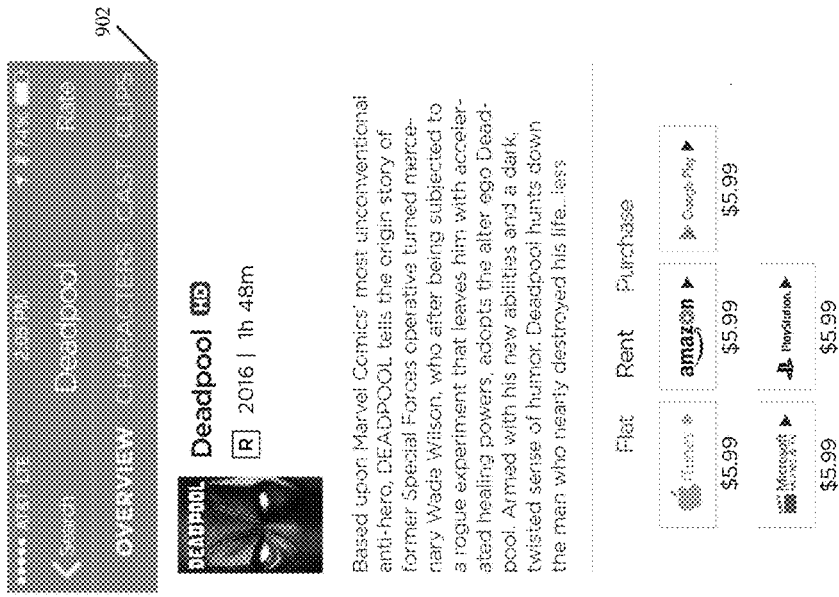

The recommendation module 214 may display the user interface elements that are buttons that have show cover art or movie poster art for each of the one or more television shows and movies. Each button when selected by the user may display a user interface that displays information about the television show or movie and allows the user to rent or purchase the television show or movie, if applicable, and stream the television show or movie to the client computing device 102 or another device such as an associated television. An example of this user interface is shown in FIG. 9 that includes information associated with the movie Deadpool including a release year, a length, a short synopsis, and five different buttons that when selected may rent and stream the movie. In addition, the user may view characters in the movie, a cast of the movie, and clips or trailers from the movie.

As an example, the client computing device 102 may be used as a second screen to select and stream the show on a television or another display. In addition, the client computing device 102 may be used as a second screen to view additional information about the show as shown in FIG. 9 while viewing the show.

The media recommendation application 108A further includes a user interface module 216 for displaying a user interface on the display 220. As an example, the user interface module 216 generates a native and/or web-based graphical user interface (GUI) that accepts input and provides output viewed by users of the client computing device 102. The client computing device 102 may provide realtime automatically and dynamically refreshed media recommendation information. The user interface module 216 may send data to other modules of the media recommendation application 108A of the client computing device 102, and retrieve data from other modules of the media recommendation application 108A of the client computing device 102 asynchronously without interfering with the display and behavior of the user interface displayed by the client computing device 102.

Figure 3:
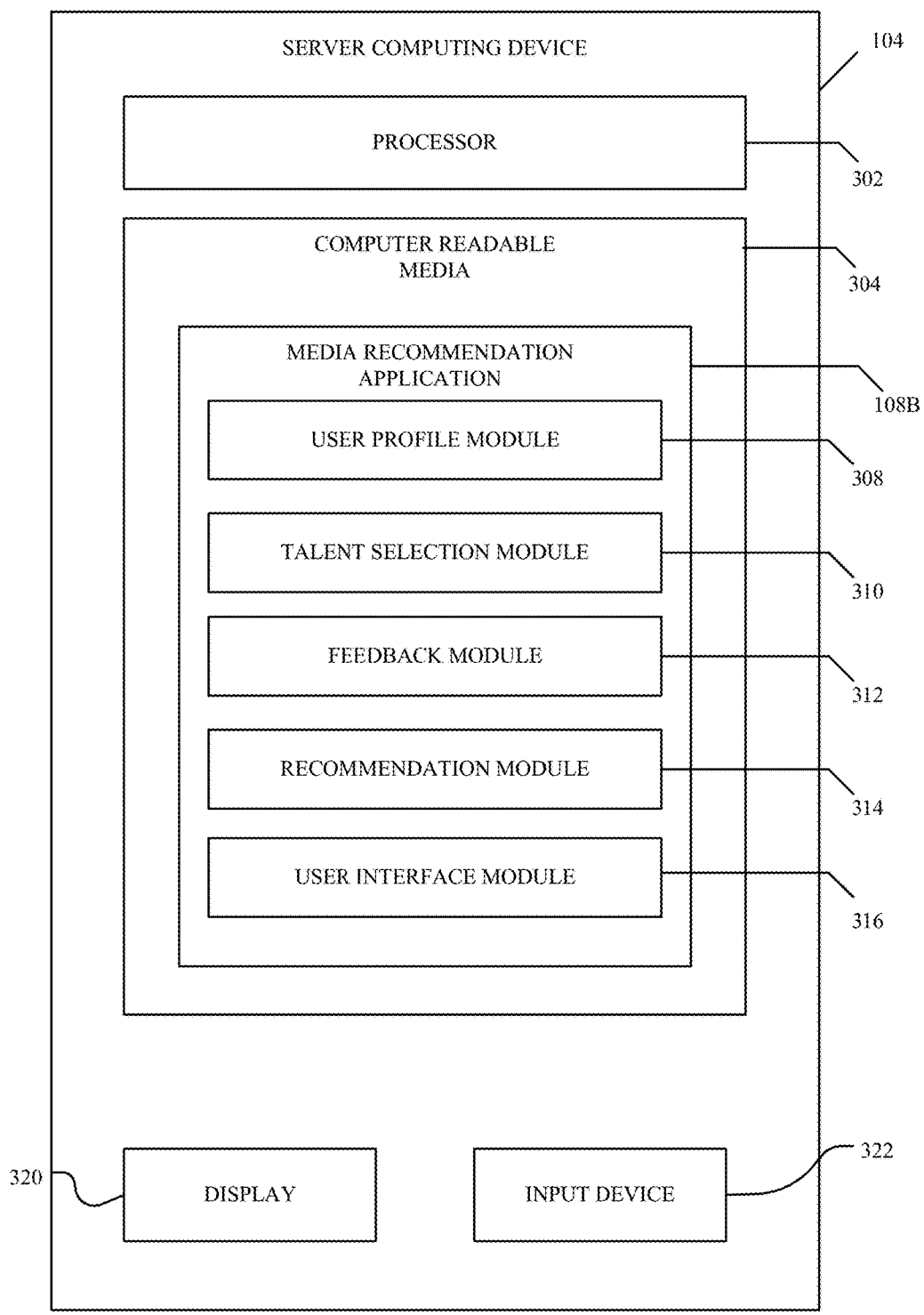
FIG. 3 illustrates a block diagram of a server computing device of the system according to an example embodiment.

FIG. 3 illustrates a block diagram of the server computing device 104 according to an example embodiment. The server computing device 104 may be a computer having a processor 302 and memory, such as a server, laptop, desktop, tablet computer, mobile computing device (e.g., a smartphone), or a dedicated electronic device having a processor and memory. The one or more processors 302 process machine/computer-readable executable instructions and data, and the memory stores machine/computer-readable executable instructions and data including one or more applications, including a server component of the media recommendation application 108B. The processor 302 and memory are hardware. The memory includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory may also include a dedicated file server having one or more dedicated processors, random access memory (RAM), a Redundant Array of Inexpensive/Independent Disks (RAID) hard drive configuration, and an Ethernet interface or other communication interface, among other components.

The server computing device 104 may include an optional display 320 and an optional input device 322. The display 320 displays visual components of the server component of the media recommendation application 108B, such as at a user interface, if applicable. The display 320 can include a cathode-ray tube display, a liquid crystal display, a light-emitting diode display, a touch screen display, and/or other displays. The input device 322 is used to interact with the server component of the media recommendation application 108B and may include a mouse, a keyboard, a trackpad, and/or the like. The input device 322 may be included within the display 320 if the display is a touch screen display. The input device 322 allows a user of the server computing device 104 to manipulate the user interface of the media recommendation application 108B and make adjustments to the media recommendation application 108B.

The server computing device 104 includes computer readable media (CRM) 304 in memory on which the server component of the media recommendation application 108B is stored. The computer readable media 304 may include volatile media, nonvolatile media, removable media, non-removable media, and/or another available medium that can be accessed by the processor 302. By way of example and not limitation, the computer readable media 304 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The media recommendation application 108B includes a user profile module 308 for receiving, storing, verifying, and resetting information associated with accounts for using the media recommendation system 100. The information associated with the accounts may include username and password information, address information, payment/bank information, and contact information, among other information. When a user first uses the media recommendation application 108B, the user is asked to create a user profile. The user may input a username such as an email address and a password, among other information, and transmit this information to the media recommendation application 108B. In another example, the user may be tracked based on a unique device identifier or another type of identifier. The user profile module 308 stores a representation of this information in the database 106. After the user account is created, when the client computing device 102 opens the media recommendation application 108A, a representation of the username and a representation of the password may be transmitted to the server computing device 104. The server computing device 104 verifies the username and password upon receipt and determines whether the user is an authorized user of the media recommendation application 108B. If the user is not an authorized user, then they may be denied further access to the media recommendation application 108B.

The user profile module 308 may provide an interface for resetting password information associated with a particular user account. If a user is unable to provide a correct password or other authentication information after a particular number of incorrect attempts or the password or other authentication information is unknown, the user account module 308 may send a "Forgot Password" message to the media recommendation application 108A and display a "Forgot Password" user interface. The user may submit a request that the server computing device 104 reset the password associated with the user account and send an email to an email address associated with the user account including a one-time use URL that when selected, displays a web-based user interface allowing the user to reset their password and create a new password for use with the user account. The user profile module 308 also may reset the password in other ways.

In addition, over time the user account module 308 may store user profile information associated with each user. The user profile information may include one or more selected talents, feedback information associated with one or more shows, a list of recommended shows, and a list of friends, among other information. The feedback information may include a list of shows that are liked, a list of shows that are disliked, a list of shows that are unseen, and a list of shows that are loved. The media recommendation application 108B may use this information collected by the user account module 308 along with review/rating information provided by the review data server 118 to provide media recommendations.

The media recommendation application 108B additionally includes a talent selection module 310 to determine a list of one or more talents and transmit the list of the one or more talents to the client computing device 102. Each talent may be an artist, an actor of a television show, movie, or live performance, a producer of a television show, movie, or live performance, a director of a television show, movie, or live performance, an author, a podcaster, a comedian, an artist, a musician, and a band, among others. In addition, although the media recommendation application 108B is described in the context of media, the application could be used to select and recommend food genres, chefs, restaurants, wines, beers, spirits, clothes, live streaming gamers, video games, video broadcasters, YouTubers, and board games, among others.

The media recommendation application 108B further includes a feedback module 312 for generating a list of one or more shows based on the selected one or more talents and transmitting the list of one or more shows to the client computing device 102 for feedback. The feedback module 312 determines the list of one or more shows by selecting shows having a rating of one of an IMDb rating greater than or equal to 6.9 and a Rotten Tomatoes rating greater than or equal to 61%. After the feedback module 312 receives the one or more talents, the feedback module 312 queries the database 106 for the shows that feature, star, or involve the one or more talents and have the IMDb rating greater than or equal to 6.9 or a Rotten Tomatoes rating greater than or equal to 61%. The feedback module 312 also may send a request to the review data server 118 for shows that feature, star, or involve the one or more talents and have the requisite rating greater than or equal to a threshold such as the IMDb rating greater than or equal to 6.9 or a Rotten Tomatoes rating greater than or equal to 61%. After determining the list of shows, the feedback module 312 transmits the list of shows to the client computing device 102. The user of the client computing device 102 provides feedback regarding each show of the list of shows using the feedback module 212. The user may provide feedback regarding each show by providing a gesture on the user interface element displayed on the display 220 of the client computing device 102. As an example, the user may swipe or flick the user interface element to the right to indicate that the user likes the show. The user may swipe or flick the user interface element to the left to indicate that the user dislikes the show. The user may swipe or flick the user interface element down to indicate that the user has never seen the show, is not familiar with the show, does not recall whether they have seen the show, or has no opinion regarding the show. The user may swipe or flick the user interface element up to indicate that the user loves the show. After receiving the feedback from the user, the feedback module 212 transmits the feedback to feedback module 312 of the server computing device 104. The server computing device 104 associates the feedback with the user and stores the feedback with the user profile information in the database 106.

The media recommendation application 108B includes a recommendation module 314 for providing the user with recommended media based on the selected one or more talents and the feedback. In addition, the recommended media is provided based on one or more selected media providers and may be television shows or movies. As an example, the user is requested to select one or more media providers that the user subscribes to such as Hulu, Amazon, Netflix, iTunes, Google Play, Crackle, MUBI, Epix, Fandor, HBO Now, HBO Go, PlayStation, Realeyz, YouTube, and others. The recommendation module 314 may determine a list of recommended shows that are based on the selected one or more talents and the feedback. The list of recommended shows may include a number of shows such as ten and the list of recommended shows may include shows from a first video on demand provider that the user subscribes to. The list of recommended shows also may be from a second video on demand provider but the recommendation module 314 may indicate that the user does not subscribe to the second video on demand provider.

The list of recommended shows may be ordered based on a number of factors such as recency, popularity, overall review/rating score, and number of reviews/ratings. In one example, the shows may be ordered based on whether the one or more talents had a starring role in the show, a number of reviews/ratings, and freshness (e.g., the age of the reviews/ratings). The list of recommended shows may include shows that the user has not yet seen or provided any feedback about. As an example, the recommendation module 314 queries the database 106 for the shows that feature, star, or involve the one or more talents and have the IMDb rating greater than or equal to a 6.9 or a Rotten Tomatoes rating greater than or equal to 61%. The recommendation module 314 also may send a request to the review data server 118 for shows that feature, star, or involve the one or more talents and have the requisite rating greater than or equal to a threshold such as the IMDb rating greater than or equal to 6.9 or a Rotten Tomatoes rating greater than or equal to 61%. The recommendation module 314 may remove any shows where the user has indicated that the user has already viewed the show. After determining the list of recommended shows, the recommendation module 314 transmits the list of recommended shows to the client computing device 102.

In an even further embodiment, the recommendation module 314 may utilize machine learning to provide the user with better recommendations based on user feedback and other aspects such as favorite genres of the user, an age of the viewer, a location of the viewer, a sex of the viewer, and other aspects. The recommendation module 314 may provide the recommendations based on other users who like or love the same one or more talents.

If the recommendation module 314 recommends a show that the user has already viewed, the user may provide feedback about the show. In addition, after the user views one of the recommended shows, the feedback module 312 requests that the user provide feedback about the show. As an example, the feedback module 312 may generate a notification that is sent to the client computing device 102. The client computing device 102 may display the notification that requests feedback about the show. The notification when selected may open the media recommendation application 108A. The feedback may be provided by the user and may be stored in the database 106 with the user profile information. This feedback may be used to revise and generate a new list of recommended media. As an example, the show that was viewed may be removed from the list of recommended media and a new show may be inserted in the list of recommended media. The new show may feature, star, or involve the one or more talents and have the requisite rating greater than or equal to a threshold such as the IMDb rating greater than or equal to 6.9 or a Rotten Tomatoes rating greater than or equal to 61%.

The recommendation module 314 may be used to provide recommendations for more than one user, e.g., two partners such as a husband and a wife, friends, members of a movie club, members of a book club, or members of a family. The recommendation module 314 may determine a list of media recommendations for the more than one user. The list of media recommendations may represent a list of media that each of the users may enjoy. As an example, a first user of the media recommendation system 100 may request to become friends with a second user of the media recommendation system 100. The first user may send a friend invite to the second user to accept. Once the first user and the second user are friends, the media recommendation system 100 may generate a combined list of media recommendations for the first user and second user. The first user may become friends with the second user by providing a list of contacts from a calendar application, a contact application, or existing relationships based on social media. The first user may authorize the media recommendation system 100 to obtain information from the social media server 116 and the social media server 116 may transmit relationship information to the media recommendation system 100. As an example, the first user may request that the media recommendation system 100 determine a list of friends based on Facebook friends, Twitter followers, Snapchat friends, Instagram friends, and others. The recommendation module 314 may determine a list of recommended media that is based on the one or more talents selected by the first user, the feedback from the first user, the one or more talents selected by the second user, and the feedback from the second user. As an example, the list of recommended media may include television shows or movies that include actors that were selected by the first user and/or the user and include and have the IMDb rating greater than or equal to 6.9 or a Rotten Tomatoes rating greater than or equal to 61%.

In an additional embodiment, a user may choose to publically share their viewing history and feedback with others and become friends with others. Such a user may be a public figure such as an actor, a performer, a professional athlete, or a media personality.

As another example, an artist such as the Rolling Stones may be touring the country and may use the media recommendation system 100 to request a suggested set list from users of the media recommendation application 108. Each user that has purchased tickets to a concert in Los Angeles may provide permission to share their media history that may include information about how many times a user has played songs, liked songs, and loved songs. The set list may be automatically generated based on this information.

In a further embodiment, the recommendation module 314 may determine when a first client computing device and a second client computing device are within a particular range of one another. As an example, the first client computing device may setup a mesh or ad-hoc network and the second client computing device may connect to the ad-hoc network using a particular protocol. This could happen when the first user and the second user are located in a same room and want to watch a show together. Alternatively, this could happen when the first user and the second user are located in a vehicle and attempting to decide on a movie or restaurant.

In a further embodiment, the recommendation module 314 may recommend a particular talent for the user. In certain instances, the recommendation module 314 may recommend a talent that may be featured in shows that are liked or loved by the user or may recommend a talent that may be involved in shows that are in a similar genre as those shows that are liked or loved by the user.

The media recommendation application 108B includes a user interface module 318. The user interface module 318 receives requests or other communications from the client computing devices 102 and transmits a representation of requested information, user interface elements, and other data and communications to the client computing device 102 for display on the display 220. As an example, the user interface module 318 generates a native and/or web-based graphical user interface (GUI) that accepts input and provides output by generating content that is transmitted via the communications network 112 and viewed by a user of the client computing device 102. The user interface module 318 may provide realtime automatically and dynamically refreshed information to the user of the client computing device 102 using Java, Javascript, AJAX (Asynchronous Javascript and XML), ASP.NET, Microsoft .NET, and/or node.js, among others. The user interface module 318 may send data to other modules of the media recommendation application 108B of the server computing device 104, and retrieve data from other modules of the media recommendation application 108B of the server computing device 104 asynchronously without interfering with the display and behavior of the media recommendation application 108A displayed by the client computing device 102. As an example, data may be retrieved using XMLHttpRequest objects or using WebSockets.

Figure 4:
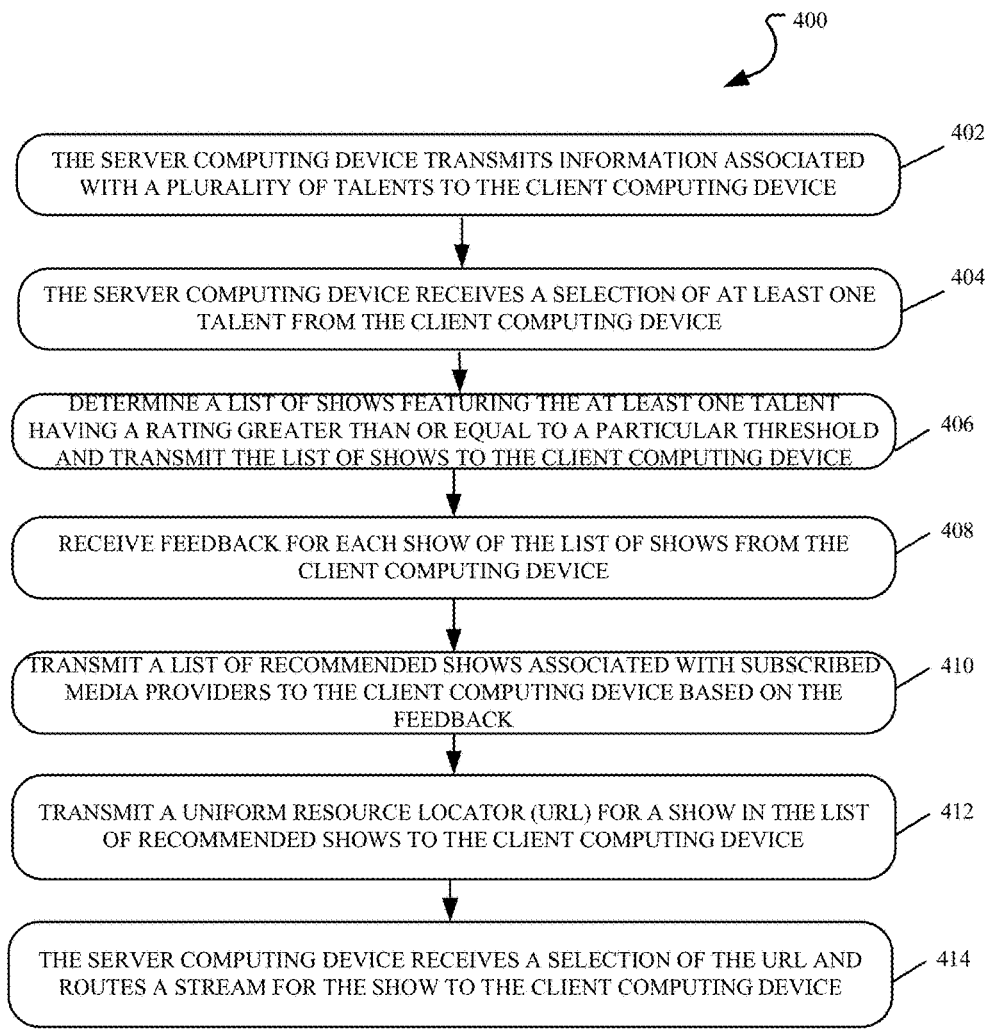
FIG. 4 illustrates a flowchart for determining recommended shows according to an example embodiment.

FIG. 4 illustrates a flowchart of a process for determining recommended shows by the server computing device 104 according to an example embodiment. In a first step 402, the server computing device 104 transmits information associated with a plurality of talents to the client computing device 102. As an example, the server computing device 104 may transmit the names of one or more actors and images of the one or more actors to the client computing device 102. The client computing device 102 may display representations of the plurality of talents on the display 220 of the client computing device 102.

Next, in step 404, the server computing device 104 receives a selection of at least one talent from the client computing device 102. As an example, the user may select a first talent and a second talent and the client computing device 102 transmits information associated with the first talent and the second talent to the server computing device 104. The server computing device 104 may store the selected talents with the user profile information in the database 106. Next, in step 406, the server computing device 104 may determine a list of one or more shows that feature, star, or involve the at least one talent selected by the user. The list of one or more shows may have a rating or review greater than or equal to a particular threshold. As an example, the one or more shows may have the requisite rating greater than or equal to a threshold such as an IMDb rating greater than or equal to a 6.9 or a Rotten Tomatoes rating greater than or equal to 61%. The server computing device may transmit the list of shows to the client computing device 102 for feedback.

In step 408, the server computing device 104 receives feedback for each show in the list of shows from the client computing device 102. For each show, the user of the client computing device 102 may indicate whether the user likes a show, dislikes a show, has not viewed a show or is unfamiliar with a show, or loves a show. If the user skips a show in the list of shows, the server computing device 104 may assume that the user has not viewed the show or is unfamiliar with the show.

Based on this feedback, in step 410, the server computing device 104 determines a list of recommended shows for the user. The list of recommended shows is associated with subscribed media providers for the user. As an example, the user may subscribe to a first media provider (e.g., iTunes), a second media provider (e.g., Netflix), but not a third media provider (e.g., Hulu). Each of the shows on the list of recommended shows may be available from the first media provider and/or the second media provider. Alternatively, the server computing device 104 may indicate that recommended shows are available on the third media provider but indicate that the user is not a subscriber. In addition, each of the shows on the list of recommended shows may feature, star, or involve the at least one talent selected by the user and may have the requisite rating greater than or equal to a threshold such as an IMDb rating greater than or equal to 6.9 or a Rotten Tomatoes rating greater than or equal to 61%. In addition, each show on the list of recommended shows has not been viewed by the user and does not have any feedback from the user, e.g., the user has not indicated whether the user likes the show, dislikes the show, or loves the show.

The server computing device 104 may transmit information associated each show in the list of recommended shows to the client computing device 102 such as a uniform resource locator (URL) for the show. The URL may be a deep link such that when selected by the client computing device 102, may stream the show to the client computing device 102 or another device. In step 412, the server computing device 104 may transmit the URL to the client computing device. In step 414, the server computing device may receive the selection of the URL and route a stream for the show from the media provider to the client computing device 102 or another device.

Figure 5:
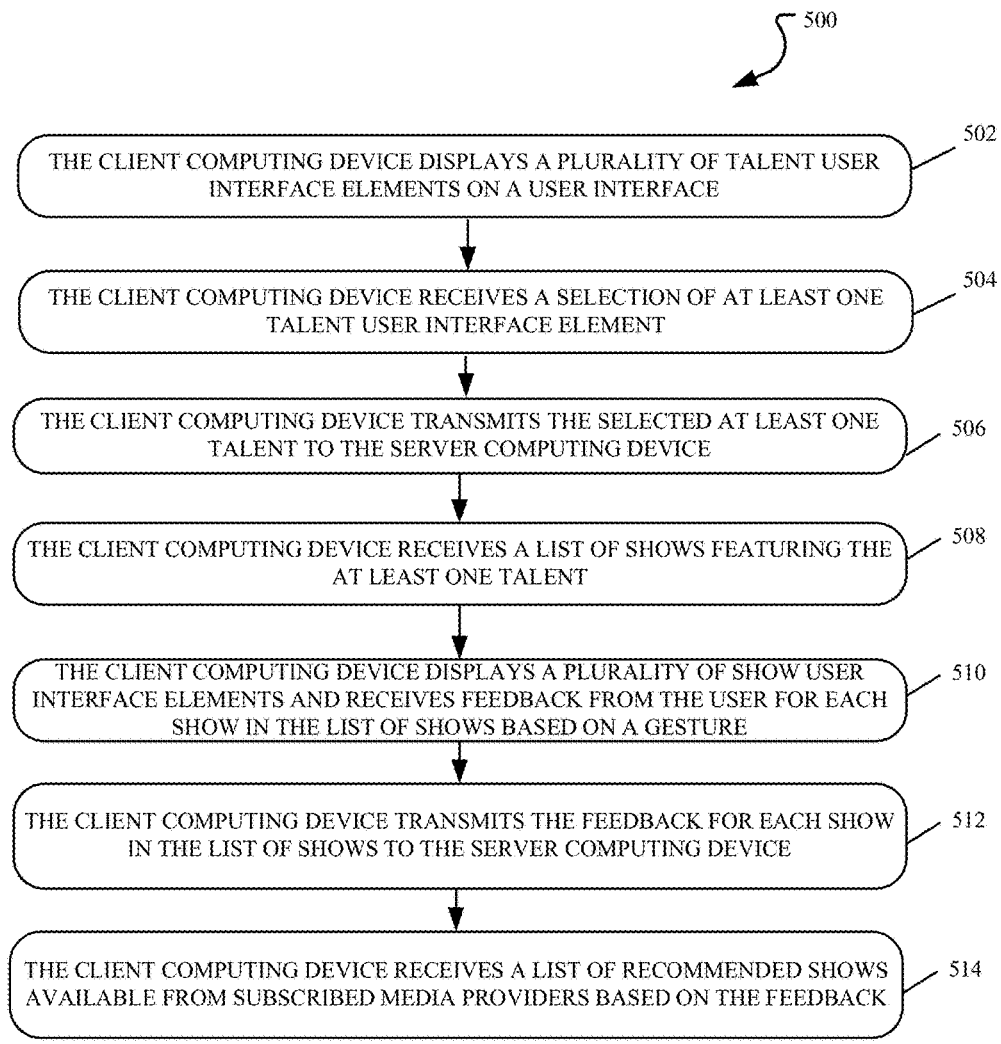
FIG. 5 illustrates a flowchart for receiving recommended shows according to an example embodiment.

FIG. 5 illustrates a flowchart of a process for receiving recommended shows by the client computing device 102 according to an example embodiment. In a first step 502, the client computing device 102 displays a plurality of talent user interface elements on a user interface. The user interface may be displayed on the display 220 of the client computing device 102 and may include buttons. Each button may include an image of an actor. In step 504, the client computing device 104 receives a selection of at least one of the plurality of talent user interface elements. A user may select the at least one of the plurality of talent user interface elements by tapping on the buttons shown on the touchscreen of the client computing device 102. In step 506, the client computing device 102 may transmit the selected at least one talent to the server computing device 104. As an example, the user may select Julia Roberts and Joe Pesci.

Next, in step 508, the client computing device 102 receives a list of shows that may feature, star, or involve the at least one talent selected by the user. The list of one or more shows may have a rating or review greater than or equal to a particular threshold. As an example, the one or more shows may have the requisite rating greater than or equal to a threshold such as an IMDb rating greater than or equal to 6.9 or a Rotten Tomatoes rating greater than or equal to 61%. The server computing device 104 may transmit the list of shows to the client computing device 102 for feedback.

In step 510, the client computing device 102 displays a plurality of show user interface elements associated with the list of shows from the server computing device 104. As an example, the client computing device 102 may display an image that represents a show on the display of the client computing device 102. The client computing device may display one or more tiles. Each tile may be a thumbnail image that represents a show on the display of the client computing device 102. The user may select a tile and the image that represents the show may display on the display 220 of the client computing device 102. The user may provide feedback for the show such as indicating whether the user likes the show, dislikes the show, is not familiar with the show or has not seen the show, or loves the show. As an example, the user may swipe or flick the image to the right to indicate that the user likes the show. The user may swipe or flick the image to the left to indicate that the user dislikes the show. The user may swipe or flick the image down to indicate that the user has never seen the show, is not familiar with the show, does not recall whether they have seen the show, or has no opinion regarding the show. The user may swipe or flick the image up to indicate that the user loves the show. After receiving the feedback from the user, in step 512, the feedback module 212 transmits the feedback to feedback module 312 of the server computing device 104. The server computing device 104 associates the feedback with the user and stores the feedback with the user profile information in the database 106.

In step 514, the client computing device 102 receives a list of recommended shows available from subscribed media providers based on the feedback. Each show in the list of recommended shows may feature, star, or involve the at least one talent selected by the user. In addition, each show in the list of recommended shows may have the requisite rating greater than or equal to a threshold such as an IMDb rating greater than or equal to 6.9 or a Rotten Tomatoes rating greater than or equal to 61%. The list of recommended shows is associated with subscribed media providers for the user. As an example, the user may subscribe to a first media provider (e.g., iTunes), a second media provider (e.g., Netflix), but not a third media provider (e.g., Hulu). Each of the shows on the list of recommended shows may be available from the first media provider and/or the second media provider. Further, each show in the list of recommended shows does not have any recorded feedback from the user. In other words, each show on the list of recommended shows has not been viewed by the user and does not have any feedback from the user, e.g., the user has not indicated whether the user likes the show, dislikes the show, or loves the show.

The user may provide feedback regarding each show in the list of recommended shows. As an example, the user may have viewed one of the shows and liked that show. Based on this feedback, the server computing device 104 may revise the list of recommended shows by removing that show from the list of recommended shows, adding a new show to the list of recommended shows, and transmitting a revised list of recommended shows to the client computing device 102.

Figure 6:
FIGS. 6-13 illustrate example screenshots of user interfaces of a media recommendation application according to an example embodiment.

FIG. 6 shows a screenshot 602 of a user interface of the media recommendation application 108A displayed on the display 220 of the client computing device 102. The user interface shown in the screenshot 602 may be provided by the talent selection module 210. As shown in FIG. 6, a plurality of images of actors is shown on the display 220. Each actor represents a selectable talent.

Figure 7:
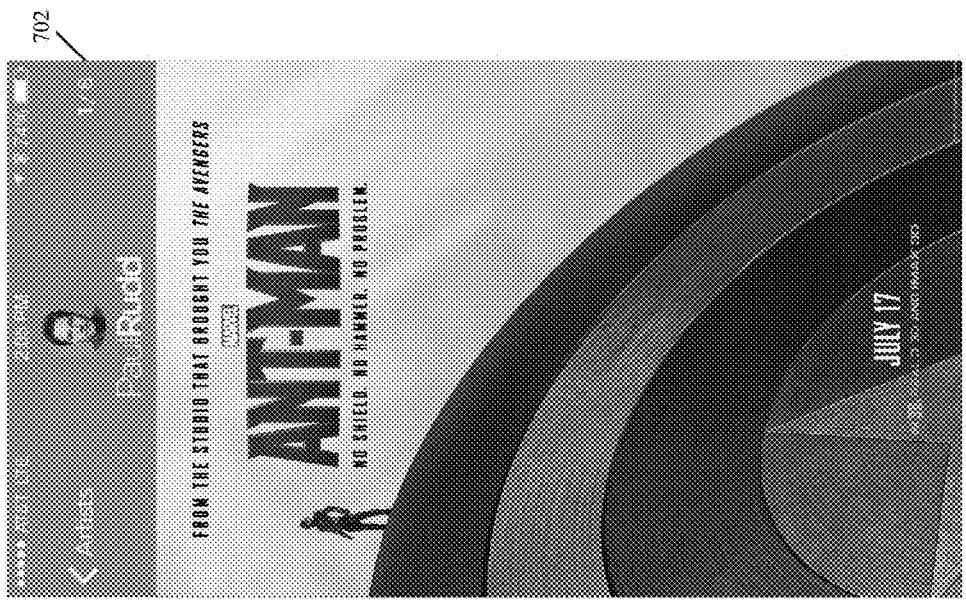

FIG. 7 shows a screenshot 702 of a user interface of the media recommendation application 108A displayed on the display 220 of the client computing device 102. The user interface shown in the screenshot 702 may be provided by the feedback module 212 after the user has selected Paul Rudd as one of the selectable talents. Paul Rudd is featured in Ant-Man and the media recommendation application 108A has selected Ant-Man as a show in a list of shows. The media recommendation application 108A requests feedback regarding Ant-Man from the user. The user may provide a gesture on the Ant-Man image and indicate whether the user likes Ant-Man, dislikes Ant-Man, has not viewed Ant-Man or is unfamiliar with Ant-Man, or whether the user loves Ant-Man. As an example, the user may swipe or flick the Ant-Man image to the right to indicate that the user likes Ant-Man. The user may swipe or flick the Ant-Man image to the left to indicate that the user dislikes Ant-Man. The user may swipe or flick the Ant-Man image down to indicate that the user has never seen Ant-Man, is not familiar with Ant-Man, does not recall whether they have seen Ant-Man, or has no opinion regarding Ant-Man. The user may swipe or flick the Ant-Man image up to indicate that the user loves Ant-Man.

Figure 8:

FIG. 8 shows a screenshot 802 of a user interface of the media recommendation application 108A displayed on the display 220 of the client computing device 102. The user interface shown in the screenshot 802 may be provided by the recommendation module 214. The screenshot 802 shows tiles that represent recommended media for the user including the movies Stranger than Fiction, American Hustle, 42, Almost Famous, and others.

FIG. 9 shows a screenshot 902 of a user interface of the media recommendation application 108A displayed on the display 220 of the client computing device 102. The user interface shown in the screenshot 902 provides details regarding a selected movie, e.g., Deadpool. As shown in FIG. 9, the user may view an overview about the movie including a title and a synopsis about the movie, among other information. In addition, the user interface includes a number of buttons that when selected may rent the movie and stream the movie to a device such as the client computing device 102 using a particular media provider such as iTunes, Amazon, Google Play, Microsoft Movies & TV, or PlayStation.

Figure 10:
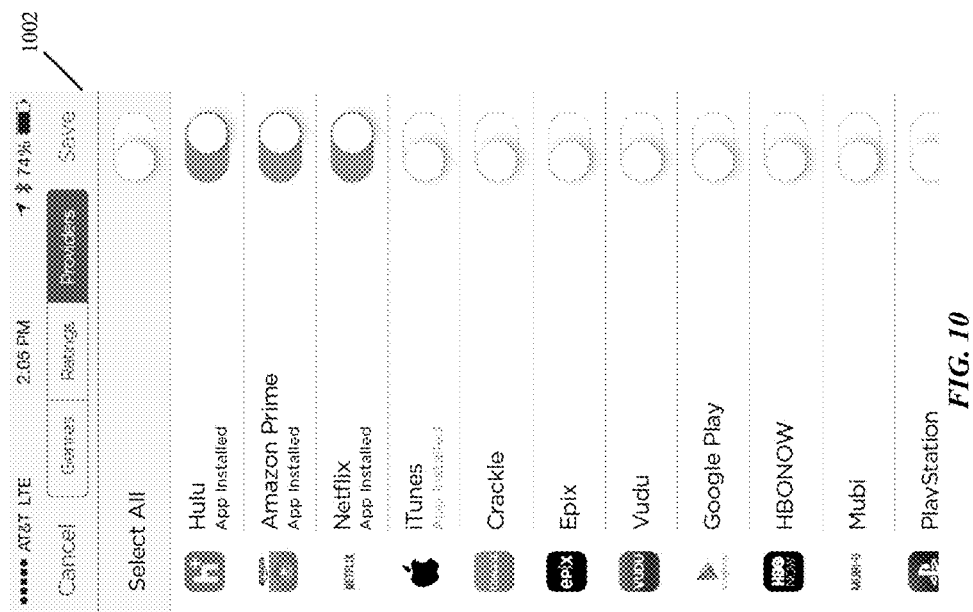

FIG. 10 shows a screenshot 1002 of a user interface of the media recommendation application 108A displayed on the display 220 of the client computing device 102. As shown in FIG. 10, the user may select user interface elements, e.g., toggle switches, associated with service providers. As an example, the user is requested to select one or more media providers that the user subscribes to such as Hulu, Amazon, Netflix, iTunes, Google Play, Crackle, MUBI, Epix, Fandor, HBO Now, HBO Go, PlayStation, Realeyz, YouTube, and others. The user is also requested to install an application that may be associated with the one or more media providers, provide login information for the one or more media providers, and provide payment information. In addition, the user may indicate that that they would like to limit the recommended shows to particular genres (e.g., action, drama, comedy, western) and may indicate that the user would like to limit recommended shows based on the Motion Picture Association of America film rating system (e.g., G, PG, PG-13, R).

Figure 11:
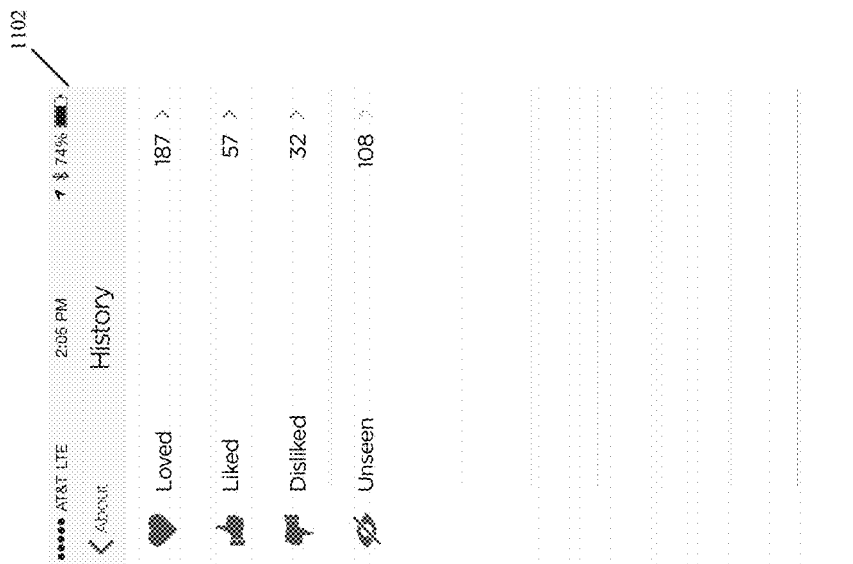

FIG. 11 shows a screenshot 1102 of a user interface of the media recommendation application 108A displayed on the display 220 of the client computing device 102. As shown in FIG. 11, the user may view their feedback history associated with their user profile. The user interface indicates that the user has indicated that they love 187 shows, like 57 shows, dislike 32 shows, and have not seen 108 shows. The media recommendation application 108A uses this history to determine a list of recommended shows for the user.

Figure 12:

FIG. 12 shows a screenshot 1202 of a user interface of the media recommendation application 108A displayed on the display 220 of the client computing device 102. The user interface shown in the screenshot 1202 may be provided by the recommendation module 214. In this case, the screenshot shows tiles that represent recommended media for more than one user, e.g., Family. The recommended media include the movies American Hustle, Ant-Man, Judgment at Nuremberg, Interstellar, and others. The server computing device 104 determines that each user of "Family" would like to view the recommended movies based on their selected talents and feedback.

Figure 13:

FIG. 13 shows a screenshot 1302 of a user interface of the media recommendation application 108A displayed on the display 220 of the client computing device 102. As shown in FIG. 13, the media recommendation application 108A may recommend a suggested talent for the user. In this case, the media recommendation application 108A recommends that the user look into shows that feature Michael Pella. If the user selects the user interface element that includes the image of Michael Pella, the user may be asked to provide feedback about shows that feature Michael Pella and future media recommendations may include shows featuring Michael Pella based on the feedback.

Figure 14:
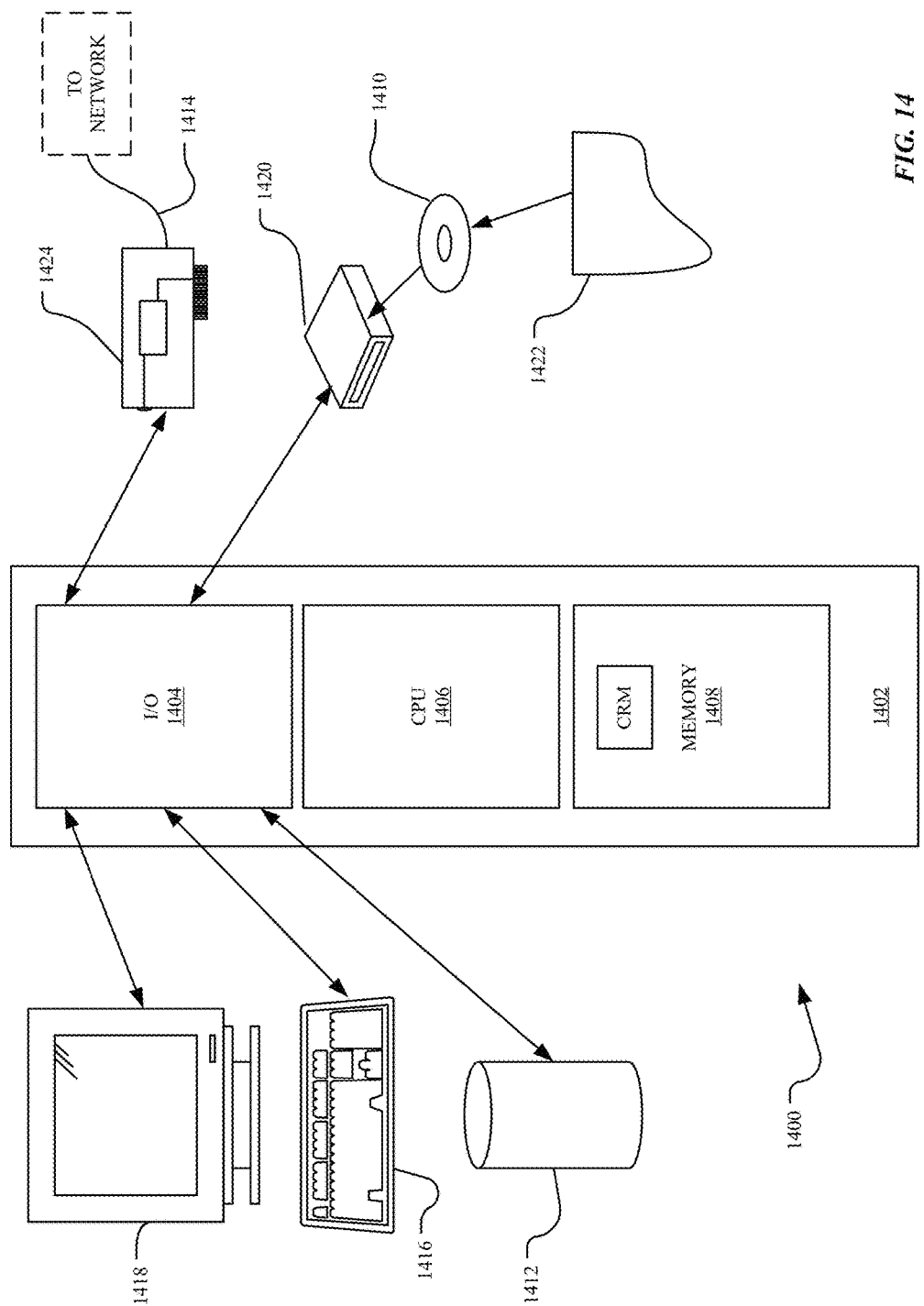
FIG. 14 illustrates a block diagram of an example computer device for use with the example embodiments.

FIG. 14 illustrates an example computing system 1400 that may implement various systems, such as the client computing device 102, the server computing device 104, and the methods discussed herein, such as process 400 and process 500. A general purpose computer system 1400 is capable of executing a computer program product to execute a computer process. Data and program files may be input to the computer system 1400, which reads the files and executes the programs therein such as the client component of the media recommendation application 108A and the server component of the media recommendation application 108B. Some of the elements of a general purpose computer system 1400 are shown in FIG. 14 wherein a processor 1402 is shown having an input/output (I/O) section 1404, a central processing unit (CPU) 1406, and a memory section 1408. There may be one or more processors 1402, such that the processor 1402 of the computer system 1400 comprises a single central-processing unit 1406, or a plurality of processing units, commonly referred to as a parallel processing environment. The computer system 1400 may be a conventional computer, a server, a distributed computer, or any other type of computer, such as one or more external computers made available via a cloud computing architecture. The presently described technology is optionally implemented in software devices loaded in memory 1408, stored on a configured DVD/CD-ROM 1410 or storage unit 1412, and/or communicated via a wired or wireless network link 1414, thereby transforming the computer system 1400 in FIG. 14 to a special purpose machine for implementing the described operations.

The memory section 1408 may be volatile media, non-volatile media, removable media, non-removable media, and/or other media or mediums that can be accessed by a general purpose or special purpose computing device. For example, the memory section 1408 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include an information delivery technology. The communication media may include wired and/or wireless connections and technologies and be used to transmit and/or receive wired and/or wireless communications.

The I/O section 1404 is connected to one or more user-interface devices (e.g., a keyboard 1416 and a display unit 1418), a disc storage unit 1412, and a disc drive unit 1420. Generally, the disc drive unit 1420 is a DVD/CD-ROM drive unit capable of reading the DVD/CD-ROM medium 1410, which typically contains programs and data 1422. Computer program products containing mechanisms to effectuate the systems and methods in accordance with the presently described technology may reside in the memory section 1404, on a disc storage unit 1412, on the DVD/CD-ROM medium 1410 of the computer system 1400, or on external storage devices made available via a cloud computing architecture with such computer program products, including one or more database management products, web server products, application server products, and/or other additional software components. Alternatively, a disc drive unit 1420 may be replaced or supplemented by a floppy drive unit, a tape drive unit, or other storage medium drive unit. The network adapter 1424 is capable of connecting the computer system 1400 to a network via the network link 1414, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1400 is connected (by wired connection and/or wirelessly) to a local network through the network interface or adapter 1424, which is one type of communications device. When used in a WAN-networking environment, the computer system 1400 typically includes a modem, a network adapter, or any other type of communications device for establishing communications over the wide area network. In a networked environment, program modules depicted relative to the computer system 1400 or portions thereof, may be stored in a remote memory storage device. It is appreciated that the network connections shown are examples of communications devices for and other means of establishing a communications link between the computers may be used.

In an example implementation, source code executed by the client computing device 102, the server computing device 104, a plurality of internal and external databases, source databases, and/or cached data on servers are stored in the database 106, memory of the client computing device 102, memory of the server computing device 104, or other storage systems, such as the disk storage unit 1412 or the DVD/CD-ROM medium 1410, and/or other external storage devices made available and accessible via a network architecture. The source code executed by the client computing device 102 and the server computing device 104 may be embodied by instructions stored on such storage systems and executed by the processor 1402.

Some or all of the operations described herein may be performed by the processor 1402, which is hardware. Further, local computing systems, remote data sources and/or services, and other associated logic represent firmware, hardware, and/or software configured to control operations of the media recommendation system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1402 and a user may interact with a Graphical User Interface (GUI) using one or more user-interface devices (e.g., the keyboard 1416, the display unit 1418, and the user devices 1404) with some of the data in use directly coming from online sources and data stores. The system set forth in FIG. 14 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
    a memory; and
    at least one processor to:
        transmit information associated with a plurality of talents to a client computing device;
        receive a selection of at least one talent of the plurality of talents from the client computing device associated with a user profile;
        determine a list of shows featuring the at least one talent, each show in the list of shows having one of an IMDb rating greater than or equal to a particular threshold and a Rotten Tomatoes rating greater than or equal to a particular threshold;
        transmit the list of shows featuring the at least one talent to the client computing device;
        receive feedback for each show of the list of shows from the client computing device; and
        transmit a list of recommended shows available from subscribed media providers to the client computing device based on the feedback.

2. The system of claim 1, the at least one processor further to receive the feedback for each show in the list of shows and store the feedback in a database, the feedback for each show comprising one of love, like, unseen, and dislike.

3. The system of claim 1, wherein the client computing device is a first client computing device, the selection is a first selection, the user profile is a first user profile, the list of shows is a first list of shows, and the feedback is first feedback, the at least one processor further to:
- receive a second selection of at least one talent from a second client computing device associated with a second user profile;
- determine a second list of shows featuring the at least one talent having the rating greater than or equal to the particular threshold;
- transmit the second list of shows featuring the at least one talent to the second client computing device;
- receive second feedback for each show in the second list of shows from the second client computing device; and
- transmit a combined list of recommended shows associated with subscribed media providers to the first client computing device and the second client computing device based on the first feedback and the second feedback.

4. The system of claim 1, the at least one processor further to determine the list of shows featuring the at least one talent, each show in the list of shows having a rating of one of an IMDb rating greater than or equal to 6.9 and a Rotten Tomatoes rating greater than or equal to 61%.

5. The system of claim 1, the at least one processor further to determine the list of recommended shows, each show in the list of recommended shows having one of an IMDb rating greater than or equal to 6.9 and a Rotten Tomatoes rating greater than or equal to 61%.

6. The system of claim 1, the at least one processor further to receive audio captured by a microphone of the client computing device and determine the feedback based on the audio.

7. The system of claim 1, wherein the talent comprises one of an actor, a producer, a director, an author, a musician, a band, and a podcaster.

8. A system comprising:
- a memory; and
- at least one processor to:
  - display a plurality of talent user interface elements on a user interface displayed on a touchscreen display, each talent user interface element associated with a talent;
  - receive a selection of at least one talent user interface element of the plurality of user interface elements;
  - transmit the selection of the at least one talent to a server computing device;
  - receive, from the server computing device, a list of shows featuring the at least one talent, each show in the list of shows having one of an IMDb rating greater than or equal to a particular threshold and a Rotten Tomatoes rating greater than or equal to a particular threshold;
  - display a plurality of show user interface elements on the user interface displayed on the touchscreen display, each show user interface element associated with a show in the list of shows;
  - receive feedback for each show in the list of shows based on a gesture provided on the touchscreen to each show user interface element;
  - transmit the feedback for each show in the list of shows to the server computing device; and
  - receive, from the server computing device, a list of recommended shows available from subscribed media providers based on the feedback.

9. The system of claim 8, the at least one processor further to receive the feedback for each show in the list of shows based on the gesture, the gesture representing one of love, like, unseen, and dislike.

10. The system of claim 8, the at least one processor further to receive the feedback for each show in the list of shows based on the gesture, the gesture comprising one of a swipe right to a show user interface element for like, swipe left to a show user interface element for dislike, swipe down a show user interface element for unseen, and swipe up to a show user interface element for love.

11. The system of claim 8, the at least one processor further to receive the feedback for each show in the list of shows based on the gesture, the gesture comprising one of a flick right to a show user interface element for like, flick left to a show user interface element for dislike, flick down to a show user interface element for unseen, and flick up to a show user interface element for love.

12. The system of claim 8, the at least one processor further to receive the list of shows, each show in the list of shows having one of an IMDb rating greater than or equal to 6.9 and a Rotten Tomatoes rating greater than or equal to 61%.

13. The system of claim 8, the at least one processor further to receive the list of recommended shows, each show in the list of recommended shows having one of an IMDb rating greater than or equal to 6.9 and a Rotten Tomatoes rating greater than or equal to 61%.

14. The system of claim 8, wherein the talent comprises one of an actor, a producer, a director, an author, a musician, a band, and a podcaster.

15. A method comprising:
- displaying, by a processor, a plurality of talent user interface elements on a user interface displayed on a touchscreen display, each talent user interface element associated with a talent;
- receiving, by the processor, a selection of at least one talent user interface element of the plurality of user interface elements;
- transmitting, by the processor, the selection of the at least one talent to a server computing device;
- receiving, by the processor, from the server computing device, a list of shows featuring the at least one talent, each show in the list of shows having one of an IMDb rating greater than or equal to a particular threshold and a Rotten Tomatoes rating greater than or equal to a particular threshold;
- displaying, by the processor, a plurality of show user interface elements on the user interface displayed on the touchscreen display, each show user interface element associated with a show in the list of shows;
- receiving, by the processor, feedback for each show in the list of shows based on a gesture provided on the touchscreen to each show user interface element;
- transmitting, by the processor, the feedback for each show in the list of shows to the server computing device; and
- receiving, by the processor, from the server computing device, a list of recommended shows available from subscribed media providers based on the feedback.

16. The method of claim 15, further comprising receiving the feedback for each show in the list of shows based on the gesture, the gesture representing one of love, like, unseen, and dislike.

17. The method of claim 15, further comprising receiving the feedback for each show in the list of shows based on the gesture, the gesture comprising one of a swipe right to a show user interface element for like, swipe left to a show user interface element for dislike, swipe down a show user interface element for unseen, and swipe up to a show user interface element for love.

18. The method of claim 15, further comprising receiving the feedback for each show in the list of shows based on the gesture, the gesture comprising one of a flick right to a show user interface element for like, flick left to a show user interface element for dislike, flick down to a show user interface element for unseen, and flick up to a show user interface element for love.

19. The method of claim 15, further comprising receiving the list of shows, each show in the list of shows having one of an IMDb rating greater than or equal to 6.9 and a Rotten Tomatoes rating greater than or equal to 61%.

20. The method of claim 15, further comprising receiving the list of recommended shows, each show in the list of recommended shows having one of an IMDb rating greater than or equal to 6.9 and a Rotten Tomatoes rating greater than or equal to 61%.

21. The method of claim 15, wherein the talent comprises one of an actor, a producer, a director, an author, a musician, a band, and a podcaster.

22. A non-transitory computer-readable storage medium, having instructions stored thereon that, when executed by a computing device cause the computing device to perform operations, the operations comprising:

displaying a plurality of talent user interface elements on a user interface displayed on a touchscreen display, each talent user interface element associated with a talent;

receiving a selection of at least one talent user interface element of the plurality of user interface elements;

transmitting the selection of the at least one talent to a server computing device;

receiving, from the server computing device, a list of shows featuring the at least one talent, each show in the list of shows having one of an IMDb rating greater than or equal to a particular threshold and a Rotten Tomatoes rating greater than or equal to a particular threshold;

displaying a plurality of show user interface elements on the user interface displayed on the touchscreen display, each show user interface element associated with a show in the list of shows;

receiving feedback for each show in the list of shows based on a gesture provided on the touchscreen to each show user interface element;

transmitting the feedback for each show in the list of shows to the server computing device; and receiving, from the server computing device, a list of recommended shows available from subscribed media providers based on the feedback.

* * * * *